United States Patent
Barrett et al.

(10) Patent No.: US 11,175,139 B2
(45) Date of Patent: Nov. 16, 2021

(54) HYBRID INERTIAL MEASUREMENT SYSTEM AND METHOD USING A LIGHT PULSE COLD ATOM INTERFEROMETER

(71) Applicants: IXBLUE, Saint-Germain-en-Laye (FR); INSTITUT D'OPTIQUE GRADUATE SCHOOL, Palaiseau (FR); CENTRE NATIONAL DE LA RECHERCHE SCIENTIFIQUE, Paris (FR); UNIVERSITE DE BORDEAUX, Bordeaux (FR)

(72) Inventors: Brynle Barrett, Bordeaux (FR); Baptiste Battelier, Gradignan (FR); Philippe Bouyer, Talence (FR); Fabien Napolitano, Mareil-Marly (FR)

(73) Assignees: IXBLUE, Saint-Germain-en-Laye (FR); INSTITUT D'OPTIQUE GRADUATE SCHOOL, Palaiseau (FR); CENTRE NATIONAL DE LA RECHERCHE SCIENTIFIQUE, Paris (FR); UNIVERSITE DE BORDEAUX, Bordeaux (FR)

(*) Notice: Subject to any disclaimer, the term of this patent is extended or adjusted under 35 U.S.C. 154(b) by 136 days.

(21) Appl. No.: 16/488,398

(22) PCT Filed: Feb. 23, 2018

(86) PCT No.: PCT/FR2018/050440
§ 371 (c)(1),
(2) Date: Aug. 23, 2019

(87) PCT Pub. No.: WO2018/154254
PCT Pub. Date: Aug. 30, 2018

(65) Prior Publication Data
US 2019/0376790 A1    Dec. 12, 2019

(30) Foreign Application Priority Data

Feb. 23, 2017 (FR) .................................. 1751457

(51) Int. Cl.
*G01C 19/58* (2006.01)
*G01C 21/16* (2006.01)
*G01C 19/64* (2006.01)

(52) U.S. Cl.
CPC ............. *G01C 19/58* (2013.01); *G01C 19/64* (2013.01); *G01C 21/16* (2013.01)

(58) Field of Classification Search
CPC ......... G01C 19/58; G01C 19/64; G01C 21/16
See application file for complete search history.

(56) References Cited

U.S. PATENT DOCUMENTS 9,134,450 B2 *  9/2015  Desruelle ................. G01V 7/14
10,444,016 B1 * 10/2019  Kasevich ............... G01C 19/58
(Continued)

OTHER PUBLICATIONS

International Search Report, dated Jul. 26, 2018, from corresponding PCT application No. PCT/FR2018/050440.
(Continued)

*Primary Examiner* — Violeta A Prieto
(74) *Attorney, Agent, or Firm* — Nixon & Vanderhye

(57) ABSTRACT

Disclosed is a hybrid inertial measurement system including a cold atom interferometric inertial sensor having a laser source generating a sequence of laser pulses towards a cold atom burst and a conventional inertial sensor attached to the inertial reference frame of the interferometric inertial sensor. The hybrid system includes a signal processing system suitable for receiving an inertial measurement signal from the conventional inertial sensor and for generating in real time a non-linear frequency modulation signal, the feedback loop electronic system being configured to modulate in real time the central optical frequency of the laser according to
(Continued)

the modulation signal, such that the cold atom interferometric inertial sensor generates a first hybrid inertial measurement signal by atomic interferometry corrected for the relative movements of the inertial reference frame.

20 Claims, 5 Drawing Sheets

(56) References Cited

U.S. PATENT DOCUMENTS

2014/0319329 A1* 10/2014 Bidel ............... G01V 7/02
                                                                         250/251
2017/0372808 A1* 12/2017 Gill ............... G21K 1/006

OTHER PUBLICATIONS

Sébastien Merlet et al.; Operating an atom interferometer beyond its linear range; Metrologia, Jan. 6, 2009.
J. Lautier et al.; Hybridizing matter-wave and classical accelerometers; Applied Physics Letters; Oct. 6, 2014; vol. 105, No. 14; AIP Publishing LLC. U.S.
J Le Gouët et al.; Limits to the sensitivity of a low noise compact atomic gravimeter; Applied Physics B; Aug. 2008; pp. 133-144; vol. 92, No. 2; Lasers and Optics.
R. Geiger et al.; Detecting inertial effects with airborne matter-wave interferometry; Nature Communications; Sep. 20, 2011.

* cited by examiner

HYBRID INERTIAL MEASUREMENT SYSTEM AND METHOD USING A LIGHT PULSE COLD ATOM INTERFEROMETER

TECHNICAL FIELD TO WHICH THE INVENTION RELATES

The present invention generally relates to the field of inertial measurement instruments for measuring a local speed of rotation or acceleration due, for example, to gravity.

It more particularly relates to inertial measurement instrument and method based on the use of a cold atom interferometer for very accurate measurements.

It more particularly relates to an inertial acceleration, gravity and/or rotation sensor based, in particular, on an atomic interferometer.

TECHNOLOGICAL BACK-GROUND

The inertial sensors based on the atomic interferometry provide a great sensitivity and find applications in inertial navigation, seismology or geophysics, to locally measure gravity.

For about twenty years, the atomic interferometry techniques have allowed the development of new measurement instruments, for example gravimeters, gradiometer, accelerometers, gyroscopes, atomic clocks and electromagnetic field sensors.

An atomic interferometer combines optical and atomic technologies. A cold atom interferometer is a device in which matter waves propagate along spatially separated paths that delimit a closed surface. An atomic interferometer is sensitive to the inertial effects such as accelerations and rotations.

On the one hand, an atomic interferometer includes a source of atoms and a trap for cold atoms configured to generate an atom burst propagating initially in a determined direction. On the other hand, the atomic interferometer includes a laser source emitting a sequence of interrogation light pulses intended to interact with the fine structure of the atoms by photon transfer. Finally, the atomic interferometer includes an atom state measurement device.

The atomic interferometer systems have made considerable progresses since the development of the atom cooling techniques in the 1980's and 1990's. The atomic interferometry systems have a sensitivity higher by several orders of magnitude than that of the conventional mechanical sensors. However, these atomic interferometry systems are confronted with limits in terms of robustness to tilts and vibrations. On the other hand, the atomic interferometry systems have nowadays a reduced range of sensitivity compared with the conventional sensors.

According to the orientation of the source of atoms and of the atomic interferometer, it is hence possible to measure an acceleration and/or a rotation in a determined direction. The atomic interferometers allow extremely accurate measurements. The atomic interferometers find applications in the inertial sensors of the cold atom gravimeter, gradiometer, accelerometer and gyrometer type.

A particularly important application of the atomic interferometry relates to the cold atom accelerometers (CAA). Most of the cold atom accelerometers (CAA) are made according to a gravimeter configuration, whose object is to measure as accurately as possible the gravitational acceleration. The measurement axis of a gravimeter is defined by the normal to the surface of a retro-reflecting mirror arranged to reflect the interrogation field towards the cold atom burst. This normal is generally aligned with the vertical direction. The retro-reflecting mirror hence determines a reference system for the cold atom inertial sensor. These cold atom accelerometers are critically based on this reference system.

Most of the cold atom accelerometers are bulky and heavy systems adapted to operate in a controlled laboratory environment and in a limited range of acceleration.

In the mobile applications, for example inertial navigation, different factors limit mainly the operation and the performances of the cold atom accelerometers. Firstly, the interferometer no longer operates when its orientation varies randomly or when its movements are random. Indeed, the movements of the inertial system harm the stability of the reflective surface. On the other hand, a misalignment between the normal to the mirror and the local vertical axis introduces a systematic measurement error. Those questions are of technical nature and result from the use of cold atom inertial sensors outside their nominal working range.

The publication J. Le Gouet et al. "Limits of the sensitivity of a low noise compact atomic gravimeter", Appl. Phys. B 92, 133-144 (2008) describes a cold atom gravimeter and a vibration compensation technique. According to this publication, a seismometer attached to the retro-reflecting mirror acquires external vibration measurements and a pre-compensation loop makes it possible to correct, as a function of the previous interferometric measurements, the phase-shift between two laser sources of the Raman pulse generation system to counterbalance the interferometric phase-shift induced by these vibrations. However, the efficiency of the vibration rejection remains limited in practice. Moreover, the seismometer operating as a high-pass filter, the low frequency vibrations persist on the gravimetry measurements.

The publication S. Merlet et al. "Operating an atom interferometer beyond its linear range", Metrologia 46, 87-94 (2009) describes a cold atom gravimeter and compares a technique of post-process correction by fringe fitting with a technique of vibration correction between two interferometric measurements. According to this publication, the post-process fringe fitting technique gives better results than the vibration correction, which has however a better temporal resolution.

The publication R. Geiger et al. ("Detecting inertial effects with airborne matter-wave interferometry", Nature Comm., 2:474, DOI: 10.1038/ncomms1479, 2011) describes a method of hybridization of acceleration measurements provided by mechanical accelerometers with measurements provided by an atomic interferometer. A mechanical accelerometer makes it possible to estimate the inertial phase shift to deduce therefrom a number of half-fringes, so as to recenter the phase-shift of the atomic interferometer to a central fringe. Then, the phase-shift measurement by the atomic interferometer is inverted in this half-fringe to obtain a more accurate value of the phase-shift. The sum of the coarse phase-shift measurement obtained by the mechanical accelerometer and of the fine phase-shift measurement obtained by the atomic interferometer is then calculated. These hybrid method and device make it possible to provide continuous measurements and to extend the measurement range thanks to the conventional sensor, while benefiting from the very high accuracy and long-term stability of the cold atom inertial sensor.

The document J. Lautier et al. "Hybridizing matter-wave and classical accelerometers" describes a system and method of hybridization of acceleration measurements provided by a conventional mechanical accelerometer with measurements provided by a cold atom interferometric accelerometer. The system moreover includes a real-time pre-compensation loop operating by adjustment of the laser phase to limit the influence of the vibrations on the interferometric measurements. These hybridization device and method make it possible to obtain a very high accuracy over a wide measurement dynamic range with a long-term stability. However, the working range of a cold atom interferometric accelerometer remains limited in dynamic range and acceleration direction.

The main problem met during the operation of an inertial sensor based on an atomic interferometer is that, due to its high sensitivity, even low amplitude and low frequency vibrations may surpass the phase-shift measurements. As the atomic interferometer has a non-linear periodic response, which limits its dynamic range, the interference fringes may be interfered by random accelerations caused by the vibrations. To overcome this difficulty, it is required to extend the sensitivity range of a cold atom inertial sensor, to extract the measurements over a great number of fringes or to dynamically control the central fringe with respect to an acceleration signal strongly varying.

In a cold atom gravimeter, subjected to the gravity force, it is known to apply a linear modulation to the laser frequency of the Raman beams to compensate for a shift induced by Doppler effect between contra-propagating beams propagating in the vertical direction. The frequency ramp coefficient is fixed and predetermined. This compensation makes it possible to compensate for a constant acceleration in a predetermined direction, in particular due to the Doppler effect between the contra-propagative Raman beams along the vertical axis.

However, this compensation does not make it possible to generally correct all the spurious vibrations or accelerations, in any direction.

OBJECT OF THE INVENTION

In order to remedy the above-mentioned drawback of the state of the art, the present invention proposes a hybrid inertial measurement system comprising a cold atom interferometric inertial sensor having a laser source adapted to generate a sequence of laser pulses towards a cold atom burst and a system for detecting an atomic interferometry inertial measurement signal relating to an inertial reference frame, and a conventional inertial sensor attached to the inertial reference frame of the cold atom interferometric inertial sensor, the conventional inertial sensor being adapted to provide a conventional inertial measurement signal of the inertial reference frame.

More particularly, it is proposed according to the invention a hybrid system with a feedback loop electronic system comprising a signal processing system adapted to receive an inertial measurement signal from the conventional inertial sensor, the signal processing system being adapted to generate in real time a non-linear frequency modulation signal as a function of the inertial measurement signal, each laser pulse of the laser pulse sequence having a predetermined optical frequency detuning with respect to a central optical frequency of the laser source, the feedback loop electronic system being configured to modulate in real time the central optical frequency of the laser as a function of the modulation signal, so as to modulate in real time said laser pulse sequence and in that the cold atom interferometric inertial sensor generates a first hybrid atomic interferometry inertial measurement signal corrected for the relative movements of the inertial reference frame with respect to the cold atom burst during a measurement cycle.

Said system makes it possible to correct the laser frequency and not only the phase thereof. Moreover, the correction is performed in real time during the measurement of the cold atom interferometric sensor and not between two interferometric measurements.

Said system also makes it possible to compensate in real time for the continuous and/or frequency modulation accelerations of the reference frame with reference to the cold atoms, due for example to the movement of the vehicle in which the inertial system is integrated. Hence, said system makes it possible to avoid a loss of sensibility of the measurement due to the movements of the sensor.

Said system makes it possible to compensate for spurious phase-shifts on the interference fringes, due to the mechanical vibrations of the reference frame. Indeed, the vibrations of the frame attached to the retro-reflecting mirror are directly measured, to control in real time the optical frequency of the laser.

Moreover, said system makes it possible to recenter the interferogram to a central fringe, where the absolute acceleration can be measured along the sensitive axis of the inertial system. This advantageously allows measuring slow drifts of the inertial system measurement axis orientation.

Other non-limitative and advantageous characteristics of the hybrid inertial measurement system according to the invention, taken individually or according to all the technically possible combinations, are the following:

the inertial reference frame includes a reflective optical component arranged so as to retro-reflect the laser pulse sequence and to generate a sequence of contra-propagative laser pulses towards the cold atom burst, the conventional inertial sensor being attached to the reflective optical component of the cold atom interferometric inertial sensor;

the signal processing system is adapted to further generate a signal for correcting the laser source phase shift;

the system further comprises a phase hopping generator configured to generate a sampling adapted to extract an interference fringe phase measurement;

the signal processing system is adapted to generate a frequency modulation signal comprising a linear modulation component and a non-linear modulation component as a function of time.

According to a particular and advantageous embodiment, the conventional inertial sensor includes a seismometer, a MEMS-based accelerometer, a MEMS-based gyrometer, a laser gyrometer or a fibre-optic gyrometer.

Advantageously, the system comprises a calculator adapted to receive a part of the first hybrid signal, the calculator being adapted to generate a second hybrid inertial measurement system as a function of the conventional inertial measurement signal and of the part of the first hybrid signal provided by the cold atom interferometric inertial sensor.

According to a particular embodiment, the cold atom interferometric inertial sensor is adapted to generate an error signal by difference between the corrected atomic interferometry inertial measurement signal at a recurrence N of the measurement cycle and the atomic interferometry inertial measurement signal at a recurrence N−1, where N is a natural integer higher than or equal to two, and the calculator is adapted to receive the error signal and a first part of the inertial measurement signal of the conventional inertial sensor, the calculator being adapted to deduce therefrom the second hybrid inertial measurement signal.

Advantageously, the signal processing system is adapted to receive the second hybrid inertial measurement system and the signal processing system is adapted to sample a part of the second hybrid inertial measurement signal in replacement of the inertial measurement signal of the conventional inertial sensor and to generate in real time a non-linear frequency modulation signal as a function of said part of the second hybrid inertial measurement signal.

In a particular embodiment, the system further comprises a coupler configured to sample in real time another part of the inertial measurement signal provided by the conventional inertial sensor, a low-pass filter adapted to filter a continuous component of said other part of the inertial measurement signal, a comparator adapted to compare a continuous component of said other part of the conventional inertial sensor inertial measurement signal with the atomic interferometry inertial measurement signal to deduce therefrom a conventional inertial sensor bias error signal, and the calculator being adapted to receive the bias error signal and the first part of the conventional inertial sensor inertial measurement signal, the calculator being adapted to calculate in real time the second hybrid inertial measurement signal by difference between the first part of the conventional inertial sensor inertial measurement signal and the bias error signal.

Advantageously, the system further comprises a coupler configured to sample in real time another part of the inertial measurement signal provided by the conventional inertial sensor, a low-pass filter adapted to filter a continuous component of said other part of the inertial measurement signal, a comparator adapted to compare a continuous component of said other part of the conventional inertial measurement signal with the atomic interferometry inertial measurement signal to deduce therefrom a conventional inertial sensor bias error signal, and the calculator being adapted to receive the bias error signal and the first part of the conventional inertial sensor inertial measurement signal, the calculator being adapted to calculate in real time the second hybrid inertial measurement signal by difference between the first part of the conventional inertial sensor inertial measurement signal and the bias error signal.

Advantageously, the calculator being adapted to transmit another part of the second hybrid inertial measurement signal towards an output of the hybrid inertial measurement system.

In a particular and advantageous embodiment, the conventional inertial sensor and the calculator are part of an inertial navigation unit comprising three accelerometers, three gyrometers and one computer adapted to generate an inertial navigation signal based on the measurements of the three accelerometers and the three gyrometers, the inertial navigation unit being adapted to receive said part of the first hybrid signal, the inertial navigation unit being adapted to generate a hybrid inertial navigation signal as a function of the inertial navigation signal and of the part of the first hybrid signal provided by the cold atom interferometric inertial sensor.

Advantageously, the inertial navigation unit is adapted to receive a part of the first hybrid inertial measurement signal and/or of the second hybrid inertial measurement signal and to generate a hybrid inertial navigation signal.

According to a particular aspect, the cold atom interferometric inertial sensor is configured to measure an atomic interferometric acceleration signal, the feedback loop comprises a microprocessor adapted to integrate the acceleration signal as a function of time to deduce therefrom a measurement of relative instantaneous speed of the inertial reference frame with respect to the atom burst, and the modulation signal of the laser central frequency includes a ramp proportional to the instantaneous speed measurement.

The invention also proposes a hybrid inertial measurement method comprising the following steps:

a. generating a sequence of laser pulses towards a cold atom burst, each laser pulse of the laser pulse sequence having a predetermined optical frequency detuning with respect to a central optical frequency of the laser source, and detecting an atomic interferometry inertial measurement signal relating to an inertial reference frame;

b. detecting a conventional inertial measurement signal of the inertial reference frame;

c. processing the conventional inertial measurement signal to generate in real time a non-linear frequency modulation signal as a function of the inertial measurement signal, d. modulating in real time the central optical frequency of the laser as a function of the modulation signal, so as to modulate in real time said laser pulse sequence and to generate a first hybrid atomic interferometry inertial measurement signal corrected for the relative movements of the inertial reference frame with respect to the cold atom burst during a measurement cycle.

DETAILED DESCRIPTION OF AN EXEMPLARY EMBODIMENT

The following description in relation with the appended drawings, given by way of non-limitative example, will allow a good understanding of what the invention consists of and of how it can be implemented.

In the appended drawings:

FIG. 1 schematically shows the principle of a cold atom interferometer;

FIG. 2 schematically shows a cold atom interferometer in Mach-Zehnder configuration;

Figure 5:
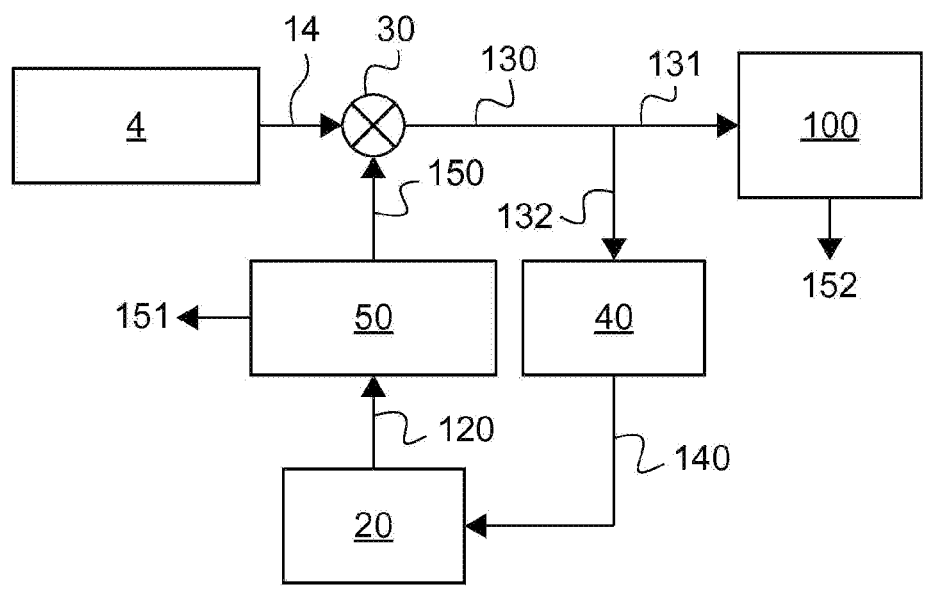
Figure 8:
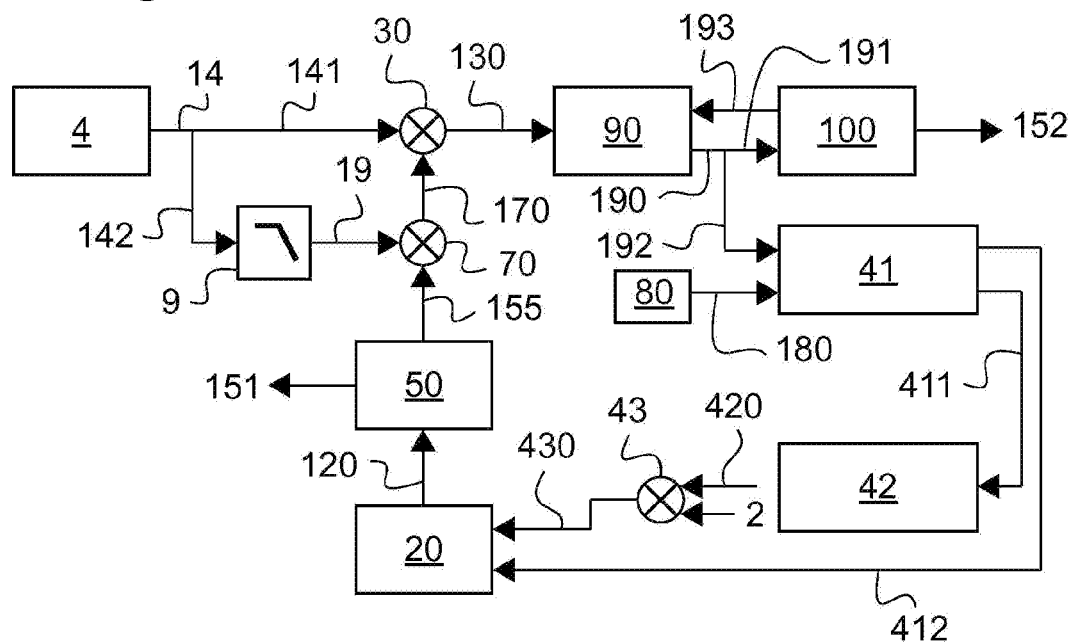
Figure 6:
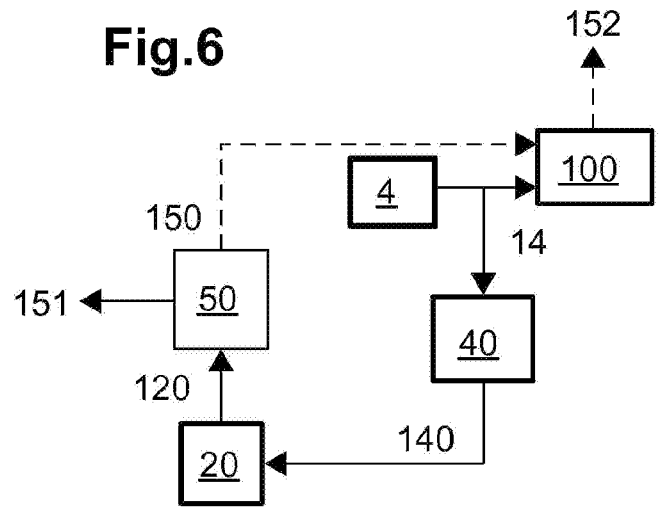
Figure 7:
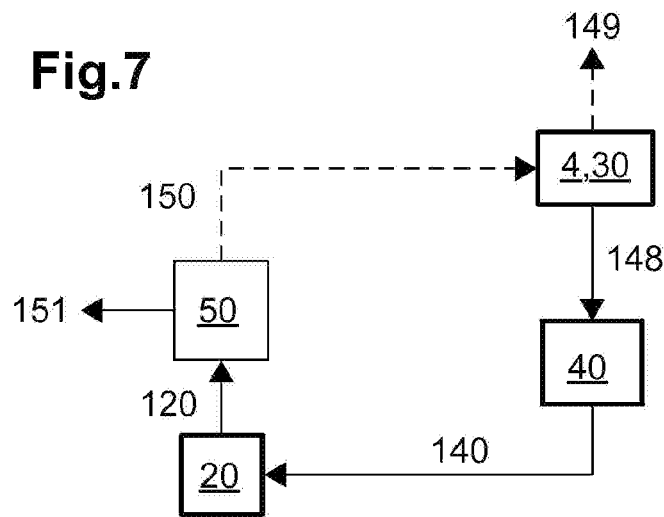

FIG. 5 schematically shows a hybrid, dual feedback loop measurement system for correcting in real time the measurements of a conventional inertial sensor by means of the signal of a cold atom inertial sensor;

FIG. 6 schematically shows a variant of a feedback loop measurement system for correcting in real time the measurements of a cold atom inertial sensor by means of the signal of a conventional inertial sensor;

FIG. 7 schematically shows another variant of a feedback loop measurement system for correcting in real time the measurements of a cold atom inertial sensor by means of the signals of a conventional sensor;

FIG. 8 schematically shows another example of a hybrid, feedback loop measurement system for correcting in real time a bias error in a conventional accelerometer by means of the measurements provided by a cold atom inertial interferometer and the random Doppler effect compensation for maintaining the interferometer contrast;

FIG. 9 illustrates measurements of acceleration in a cold atom interferometer with real time correction of the bias errors in a conventional accelerometer by means of measurements provided by a cold atom inertial interferometer and the random Doppler effect compensation for maintaining the interferometer contrast.

In the present document, it is meant by "real time correction" a correction performed during an interferometric measurement and not between two interferometric measurements.

Device

Figure 1:
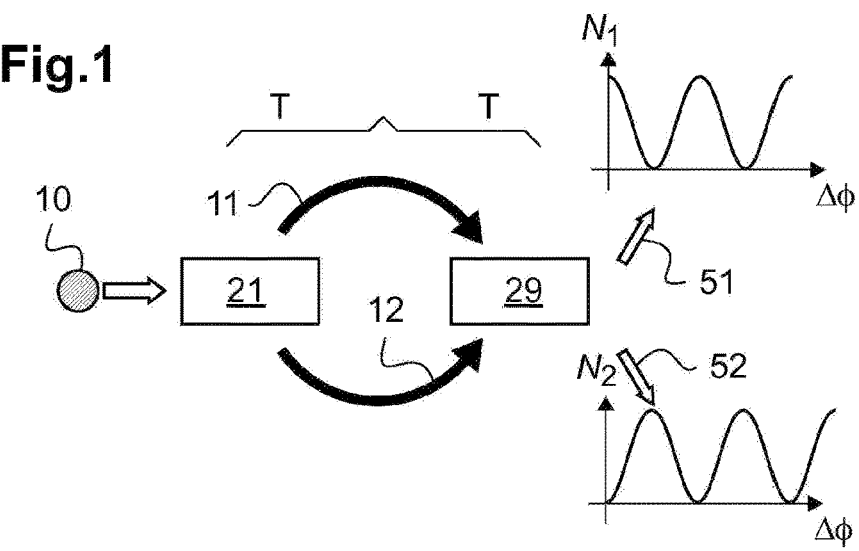

In FIG. 1 is schematically shown the principle of an atomic interferometer. An atom cloud or a cold atom burst 10 is considered. Generally, the cold atom burst 10 is initially immobilized in an atom trap, formed for example of three pairs of contra-propagating laser beams arranged along three orthogonal axes. The laser beams are possibly combined with a magnetic field to form a magneto-optical trap (MOT). At a time instant t=0, the atom trap is open to throw or let drop by gravity the atom burst following a predetermined direction.

A laser source emits an interrogation field consisted of a sequence of light pulses, to interact with the fine structure of the atoms by transfer of photons between the interrogation field and the cold atoms. The laser pulse sequence produces a coherent separation of the atom burst, at least one redirection, then a coherent recombination of the atom beams.

The light pulses of a sequence are generally temporally separated by a duration T. A sequence of three light pulses, called sequence "$\pi/2-\pi-\pi/2$" is generally used. The pulses "$\pi/2$" make it possible to separate or recombine the matter waves associated with the atoms. The pulses "$\pi$" make it possible to deflect the matter waves. Other sequences of more than three pulses are also used, in particular a sequence of four light pulses, "$\pi/2-\pi-\pi-\pi/2$". In any cases, a first light pulse 21 interacts with the atom burst 10 provided by the source of atoms to spatially separate the wave associated with each atom into a first atom wave 11 moving along a first path and, respectively, a second atom wave 12 moving along a second path. At least one second light pulse 22 interacts with the two separated atom waves 11, 12, to redirect them. Finally, a last light pulse 29 spatially recombines the two atom waves 11, 12. The surface area defined by the paths of the two atom waves 11, 12 between the separation and the recombination defines an atomic interferometry surface area. The sensitivity of the atomic interferometer is generally proportional to the surface area delimited by the two paths.

A detection system makes it possible to measure the atomic phase shift accumulated between the two atom waves 11, 12 on their respective paths between the separation and the recombination thereof. The atomic interferometer produces amplitudes of probabilities of the number of atoms on two output channels 51, 52. Let's note $N_1$ the population or number of atoms in a first state, and, respectively, $N_2$ the population or number of atoms in a second state. The number of atoms $N_1$, respectively $N_2$, on each output channel 51, respectively 52, oscillates sinusoidally as a function the total phase shift $\Delta\Phi$. Generally, complementary signals are detected on the two output channels 51 and 52, as illustrated in FIG. 1.

The atomic interferometers based on the light-matter interaction are based on the principle according to which, when an atom absorbs or emits a photon, it receives a momentum hk. A resonant light wave is used to excite an atom by momentum transfer. The most frequent light pulse atomic interferometers are based on two-photon transitions that are selective in speed, or, in other words, in optical frequency difference, the optical frequency f and the speed v being linked to each other by Doppler effect according to the formula: $f=k \cdot v$. A current example of this type of two-photon transition corresponds to a Raman transition, where two laser beams of optical frequencies $\omega 1$ and $\omega 2$ are adjusted in the vicinity of an optical transition in the considered atom, while being sufficiently detuned so that the level of excited population is sparsely populated. The frequency detuning ($\omega 1-\omega 2$) is chosen to be resonant with a radiofrequency transition between two hyperfine fundamental levels of the considered atom. A Bragg multi-photon or Bloch oscillation transition may also be used to construct an atomic interferometer. In the last cases mentioned, instead of producing transitions between two hyperfine fundamental levels, the atoms stay in the same fundamental state and only their momentum changes.

In the following of the description, the case of Raman transitions for atoms of Rubidium 87 ($^{87}$Rb) will be taken as an example. However, the principle also applies to other multi-photon transitions, for example Bragg or Bloch transitions. The same principle also applies to other atoms, for example lithium, sodium, potassium or cesium.

Figure 2:
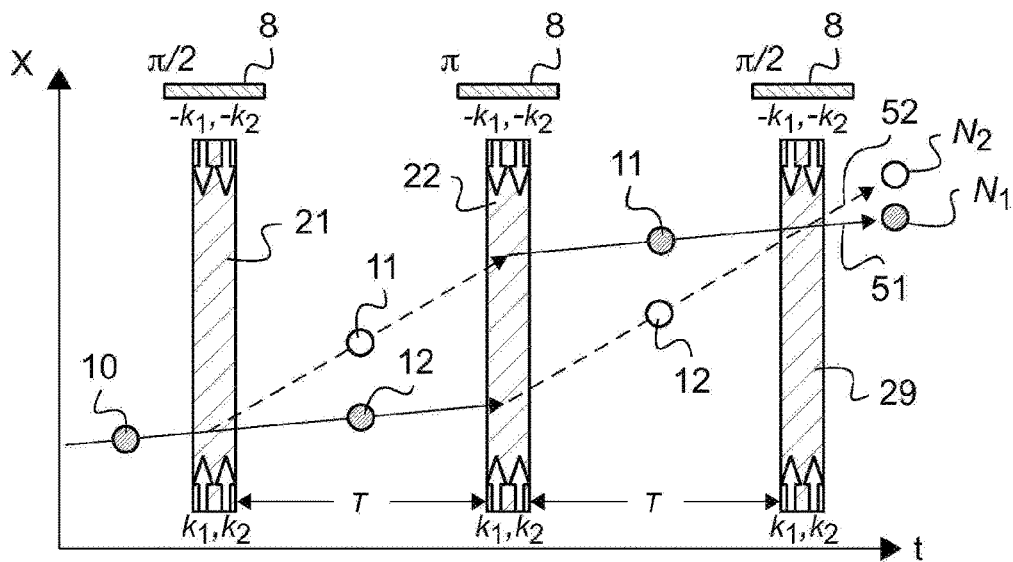

FIG. 2 shows a schematic example of atomic interferometer based on a sequence of two-photon Raman interaction photon transfer. Herein, two contra-propagating laser beams, frequency detuned with respect to the central frequency $f_c$ of the laser source, are used to generate each interaction between the interrogation field and the cold atoms. More precisely, two-photon transitions between a fundamental state |1, p0> and an excited state |2, p0+hkeff> where $k_{eff}=k_1+k_2 \approx 2k_1$, are performed. The speed of the atoms induces a quadratic offset of the energy of the states, which are separated in frequency by the sum of the hyperfine separation, denoted $\omega_{HF}$, between these two atomic states, of the Doppler shift, noted $\omega_D$, induced by the relative speed of the atoms, and of the recoil frequency, denoted $\omega_{rec}$, induced by the two-photon absorption.

An atom burst 10 is initially in the atomic state |1, p0>. A laser source device generates a first pair of contra-propagating pulses defined by a wave vector $k_1$ and respectively $-k_2$. More precisely, two co-propagating pulses of wave vectors $k_1$ and respectively $k_2$ are generated. A mirror 8 is arranged so as to reflect the two co-propagating pulses and to form two other co-propagating pulses of wave vectors $-k_1$ and respectively $-k_2$. The optical frequencies of the laser pulses are selected as a function of the atomic levels of the atom burst so as to interact via a non-resonant two-photon interaction. Herein, a first pair of contra-propagating pulses consisting of a pulse of wave vector $k_1$ and respectively a pulse of wave vector $-k_2$ is used. This first pair of pulses makes it possible to separate the atom burst 10 into a first atom wave 11 and a second atom wave 12. During this interaction, the atom diffuses one photon of each beam for a momentum transfer equal to $h(k_1-k_2)$. The detuning δ between the two photons that determines the condition of resonance for the Raman transition is given by:

$$\delta = \omega_{eff} - (\omega_{HF} + \omega_D + \omega_{rec})$$

where $\omega_{eff} = \omega_1 - \omega_2$ is the optical frequency difference between the two laser beams, ($\omega_{HF}$ is the separation between the two hyperfine levels of the fundamental state ($\omega_{HF} \approx 2\pi \times$ 6.8 GHz for the atom $^{87}$Rb), $\omega_D$ represents the Doppler shift due to the speed of the atoms ($\omega_D \approx 2\pi \times 100$ kHz) and $\omega_{rec}$ is the recoil frequency (or the Doppler shift due to the recoil of a photon by an atom of mass M, $\omega_{rec} \approx 2\pi \times 15$ kHz). The force of the Raman transition is higher when the central optical frequency (denoted $f_c$) of the laser is adjusted so that δ=0. In these conditions, the population of the atoms oscillates between two internal states as a function of the time of interaction with the lasers. Hence, the Raman pulses may be adjusted to coherently separate or to reflect the atom waves. When the Raman pulses are contra-propagative ($k_2 \approx -k_1$), this transition is accompanied with an exchange of momentum approximately equal to twice a one-photon transition: $h(k_2-k_1) \approx 2hk_1$. This produces a strong sensitivity to the Doppler effect associated with the relative movement of the atom.

There exist different types of atom interferometers: for example, the 3-light-pulse Mach-Zehnder atomic interferometer, the 4-light-pulse Ramsey-Bordé atomic interferometer, or the N-pulse Talbo Lau/contrast/Kapitza Dirac interferometers, where N is an integer higher than 4.

The most often used atomic interferometer geometry is based on a sequence of pulses "π/2–π–π/2". A Mach-Zehnder atomic interferometer as illustrated in FIG. 2 is hence obtained. Herein, the first pair of contra-propagating pulses 21, denoted "π/2", excites an atom in an initial state to generate a first atom wave 11 and a second atom wave 12. For a duration T, the two atom waves propagate separate from each other. A second pair of pulses 22, denoted "π", redirects the first atom wave 11 and the second atom wave 12. After another time interval T, a last pair of contra-propagating pulses 29, denoted "π/2", recombines the first atom wave 11 and the second atom wave 12 to make them interfere with each other.

The interferences are measured by detecting on one of the two output ports 51, respectively 52, the relative population $N_1$, respectively $N_2$, associated with one of the two states, i.e. corresponding to one of the atom waves 11, respectively 12. These populations $N_1$, respectively $N_2$, are generally measured by resonant fluorescence, wherein several photons can be diffused by a single atom.

The three-pulse Raman interferometer excites only two paths. The interferogram follows a sinusoidal function:

$$P_{1,2} = \frac{N_{1,2}}{N_1 + N_2} = \frac{1}{2}(1 \pm C \cos \Delta\Phi_{tot})$$

where C represents the contrast of the interference fringes and $\Delta\Phi_{tot}$ the total accumulated interferometric phase shift.

According to the orientation of the source of atoms and of the atomic interferometer, the interferometric phase shift is sensitive to an acceleration and/or a rotation in a determined direction. The atomic interferometers find applications in the inertial sensors of the cold atom gravimeter, gradiometer, accelerometer and gyrometer type. A particularly important application of the atomic interferometry relates to the cold atom accelerometers (CAA).

Figure 3:
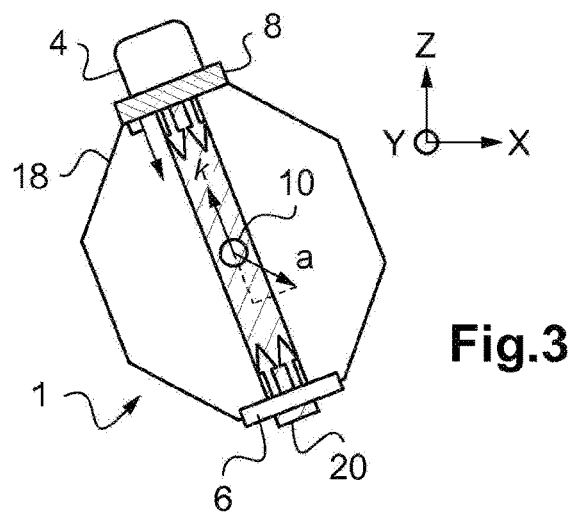
FIG. 3 shows an example of cold atom accelerometer.

FIG. 3 illustrates an example of accelerometer based on a cold atom interferometer (CAA). A cold atom cloud 10 is formed in a vacuum enclosure 1. A laser beam 20 is incident on the atom cloud 10 through a transparent window 6. The laser beam 20 is oriented along a direction defined by a vector k. A mirror 8 is arranged so as to retro-reflect the laser beam 20. In other words, the normal 18 to the surface of the mirror 8 is aligned along the direction of vector k. Hence, the cold atom accelerometer performs a measurement along the laser beam, parallel to vector k. A conventional inertial sensor 4, for example MEMS-based, is attached to the rear face of the mirror 8. The conventional sensor is arranged so as to be sensitive along the measurement axis k of the interferometric sensor. Preferably, the measurement of the conventional sensor is performed along the same axis k. As an alternative, it is sufficient to know the angle between the axis of the conventional measure and the axis of the atomic interferometry measurement. The conventional sensor and the interferometric sensor may be sensitive to different quantities. For example, the conventional sensor measures a rotation about the axis of vector k and the interferometric sensor measures an acceleration following the axis of vector k.

Let's note Z the vertical direction and X a horizontal direction of an orthonormal reference system (X, Y, Z). Generally, a rotation of the cold atom accelerometer orientation with respect to the vertical axis Z and an acceleration vector a, which is generally off-axis with respect to vector k, are considered. Such a rotation and an acceleration constitute non-negligible sources of errors for the cold atom accelerometer and/or for the conventional sensor, that have generally no measurement of the rotation and the acceleration according to the three directions of the orthonormal reference system (X, Y, Z). The present disclosure aims at correcting these errors.

The total phase-shift of the cold atom accelerometer is expressed as follows:

$$\Delta\Phi_{tot} = k_{eff} \cdot a T^2 - \Phi_0$$

where $\Phi_0$ is a constant and a represents the relative acceleration of the atoms with respect to the reference mirror. The quantity $\Phi_0$ may be linked to the laser phase, for example. The quantity $\Phi_0$ is generally used as a control parameter to scan the interference fringes, which makes possible the measurement of the phase shift due to the acceleration a. The above equation shows the high sensitivity of the atomic interferometers to the inertial effects, such as gravity. As this phase shift is proportional to $T^2$, with a time of interrogation of $T \approx 10$ ms and $k_{eff}$ of the order of $1.6 \times 10^7$ rad/m at a wavelength of 780 nm, the acceleration due to gravity induces a phase shift of $1.6 \times 10^4$ rad. By supposing a phase-shift uncertainty of the order of 1 mrad per shot, the sensitivity of the accelerometer to gravity is of about $6 \times 10^{-8}$ g.

It is known, in a cold atom gravimeter, to linearly modulate the frequency difference between the interferometric beams to a rate a adapted to cancel the frequency shift induced by Doppler effect. Hence, the atoms stay in resonance with the two-photon transition when they drop by gravity. In this case, the frequency difference is written $\omega_{eff}(t) = \delta_0 + \alpha(t)$ The total phase-shift is reduced to:

$$\Delta\Phi_{tot} = (k_{eff} \cdot g - \alpha)T^2 \quad (9)$$

This relation makes it possible to perform the measurement of gravity g according to the following method. The value of $\alpha = k_{eff} \cdot g$ is searched, for which the total phase shift of the interferometer becomes null:

$$\Delta\Phi_{tot} = 0.$$

Then, $g = \alpha/k_{eff}$ is deduced therefrom.

It is herein supposed that the angle between the incident laser beam and the reflected laser beam is null. As the output signal is sinusoidal, a minimum (or respectively a maximum) is obtained on the fringes at each phase shift of $2\pi$. Hence, the determination of the linear frequency modulation coefficient $\alpha$ that cancels the gravity for a certain duration of interrogation T is ambiguous modulo $2\pi$.

However, the equation (9) is independent from the duration of interrogation T if and only if $g = \alpha/k_{eff}$. It is possible to determine the central fringe by comparing two interferograms obtained for two distinct values of duration of interrogation T. The central fringe has indeed a reference absolute phase equal to $\alpha = k_{eff} \cdot g$ unchanged whatever the value of T. Once, the central fringe identified, new gravity measurements can be obtained rapidly, once per CAA cycle, for example every 0.2 to 1 s. This is obtained by inverting the probability $P_{1,2}$ in the domain of reciprocity of the cosine function to obtain the total phase shift:

$$\Delta\Phi_{tot} = \cos^{-1}(\pm(2P_{1,2}-1)/C)$$

$$g = \frac{\alpha}{k_{eff}} + \frac{\Delta\Phi_{tot}}{k_{eff}T^2}$$

is deduced therefrom.

The first term of this equation corresponds to the position of the central fringe (i.e. the linear frequency modulation that cancels the Doppler effect induced by gravity on the atoms) and the second term corresponds to a small acceleration correction that takes into account uncontrolled phase shifts (for example, vibrations of the mirror 8 defining a reference landmark) of at most $\pi/k_{eff}T^2$. For example, if T=10 ms and $k_{eff}$=1.6×10$^7$ rad/s the maximum acceleration correction is of 200 µg. This also implies that the value of α is determined with a relative accuracy better than 10$^{-4}$. For example, for atoms of rubidium 87, δα<<2π·2.5 kHz/s for α=2π×25 MHz/s is required to cancel gravity g with T=10 ms.

Figure 4A:
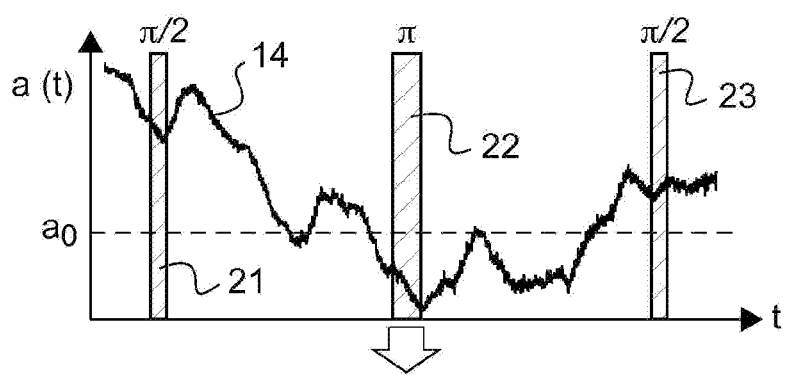
FIG. 4 illustrates acceleration measurements in a cold atom interferometer with pre-compensation for a constant acceleration between the reference of the frame and the cold atoms and a real time compensation for the phase.
Figure 4B:
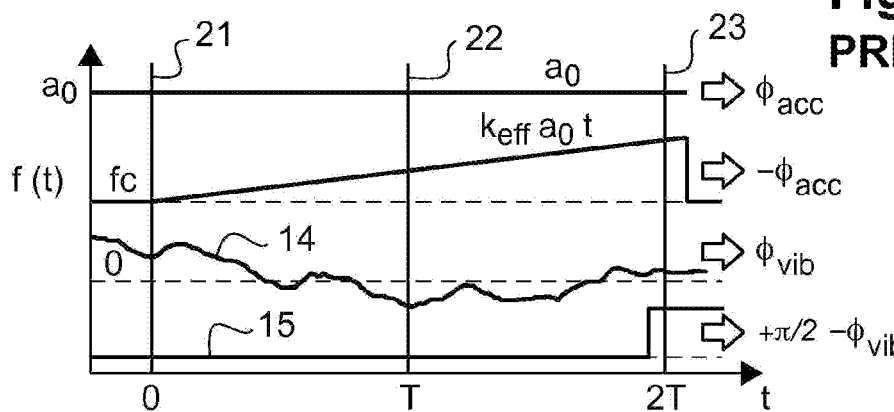

FIG. 4 illustrates an example of acceleration measurement according to the prior art. In FIG. 4A is shown a signal a(t) recorded as a function of time by means of a conventional accelerometer 4 attached to the retro-reflecting mirror 8 during a sequence of pulses 21, 22, 23 or, equivalently, π/2−π−π/2. In FIGS. 4A and 4B is shown a constant acceleration a$_0$ applying to the cold atoms. In FIG. 4B is also shown a linear frequency modulation f(t) applied to the frequency difference between incident laser beams for the two-photon interaction, this linear frequency modulation f(t) being adjusted to cancel the Doppler effect induced by the constant acceleration a$_0$ on the cold atoms. In FIGS. 4A and 4B, the curve 14 represents the vibration measurements on the mirror 8, obtained by means of the conventional accelerometer 4. The curve 15 represents a control phase applied to generate a phase hopping just before a sequence of pulses, so that the interferometer operates in the vicinity of the half-fringe, in the domain of linearity of the signal.

Figure 4C:
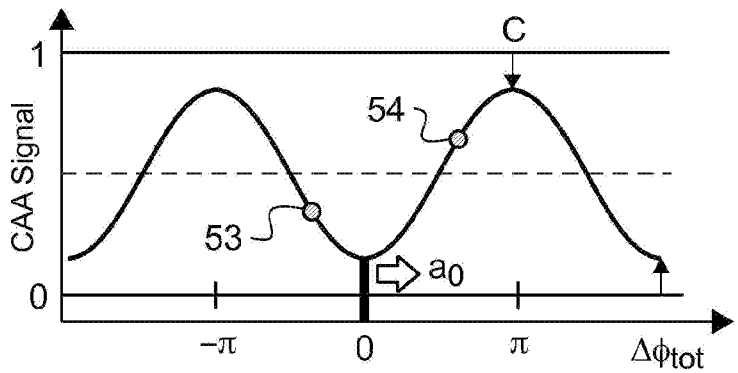

In FIG. 4C, two measurements 53, 54 of the atomic interferometer signal in the vicinity of the total phase shift of ±π/2 can be seen. These measurements 53, 54 allow an evaluation of a$_0$.

However, a loss of contrast C is observed. This loss of contrast entails a loss of sensitivity of the atomic interferometer. If the contrast C falls under a contrast threshold, the interferometer no longer operates.

It ensues from the present disclosure that this loss of contrast is due to the Doppler shift induced by the vibrations that are not compensated for during each laser pulse.

A first solution consists in isolating the frame supporting the mirror from the vibrations. However, this solution does not apply in the inertial navigation applications, in which the vibrations are part of the vehicle movement.

Within the framework of the present disclosure, another solution is based on a real time measurement of the vibrations in the same direction as the CAA by means of a conventional sensor 4 of the accelerometer or seismometer type and on an evaluation of the phase shift associated with these vibrations, using the sensitivity of the atomic interferometer to the movement of the reference frame. For example, a conventional accelerometer measures the real time acceleration. In another example, a seismometer measures the speed. The reference frame is defined by an orthonormal reference system linked to the atomic interferometer. For example, the orthonormal reference system of the reference frame comprises the normal 18 to the surface of the mirror and two axes transverse to this normal 18.

The conventional sensor is oriented so as to be sensitive along the measurement axis of the CAA. It is supposed that the angle between the measurement axis of the conventional sensor and the measurement axis of the CAA is known. Preferably, these two axes are merged.

The sensitivity of an atomic interferometer geometry to the physical effects inducing a phase shift is defined by a sensitivity function w(t). This sensitivity may be defined in terms of speed $w_v(t)$ or acceleration $w_a(t)$ for vibrations of the reference frame. The associated phase shift may be calculated by integration as a function of time:

$$\Phi(t) = \int_0^{2t} w_v(t) v_{vib}(t) dt = \int_0^{2t} w_a(t) a_{vib}(t) dt$$

where $v_{vib}(t) = \int a_{vib}(t)'dt'$ is a vibration-induced speed of the reference frame at the time instant t. It is supposed herein that $a_{vib}$ does not include the constant acceleration a$_0$ due for example to a gravity component.

According to a particular embodiment, the signals of the conventional inertial sensor 4 are integrated in real time to deduce therefrom, at each time instant t, a measurement of the speed induced by the vibrations of the reference frame.

FIG. 5 schematically shows a hybrid inertial navigation system based on a conventional inertial sensor 4 and a cold atom inertial sensor 50. A laser source 20 generates an interrogation field of the cold atom inertial sensor 50. The interrogation field comprises a laser pulse sequence. The inertial navigation system further comprises a real-time feedback loop comprising a signal processing system 40 that applies a modulation signal to the laser source 20. Finally, the inertial navigation system includes a second real-time feedback loop comprising a device 30 for correcting the signal provided by the conventional inertial sensor 4.

The cold atom inertial sensor 50 may be any type of atomic interferometer. The cold atom inertial sensor 50 is for example an accelerometer, a gravimeter, a gyroscope, a gradiometer, a magnetometer, using one or several sources of atoms (such as rubidium, potassium . . . ). The cold atom inertial sensor 50 is herein supposed to be more accurate than the conventional inertial sensor 4.

During a first recurrence, a part 132 of the raw signal 14 of the conventional inertial sensor 4 is transmitted to the signal processing system 40. The signal processing system 40 generates a modulation signal 140 that integrates the necessary elements to compensate for the effects of a movement of rotation, of accelerations and/or of low frequency vibrations of the reference frame used by the cold atom inertial sensor 50.

This modulation signal 140 is transmitted to the laser source 20 that generates the interrogation field of the cold atom inertial sensor 50. The modulation signal 140 generates in real time a modulation 120 of the central frequency of the laser source. The interrogation field is hence modulated in real time as a function of the measurements of the conventional inertial sensor 4.

In a particular and advantageous embodiment, the cold atom inertial sensor 50 produces an error signal 150 that is used to correct the bias drift of the conventional inertial sensor 4 in the second feedback loop.

At the following recurrence, a calculator 30 corrects a new measurement 14 provided by the conventional inertial sensor 4 as a function of the error signal 150. The calculator 30 hence provides a corrected signal 130 that constitutes a second hybrid inertial measurement signal. A part 131 of the corrected signal 130 is transmitted for use to an inertial navigation unit 100. The inertial navigation unit 100 generally comprises three gyroscopes, three accelerometers and a computer. This corrected signal 130 is far more accurate than the raw signal 14 provided by the conventional inertial sensor 4. Another part 132 of the corrected signal 130 is transmitted to the signal processing system 40 for updating the real-time feedback loop at the following recurrence.

That way, the raw signal 14 provided by the conventional inertial sensor 4 is periodically corrected using the output signal of the cold atom inertial sensor 50. A corrected signal 130 of the conventional sensor 4 is hence obtained.

FIG. 6 illustrates a variant comprising an inertial navigation unit 100, a cold atom inertial sensor 50 and a conventional inertial sensor 4 attached to the reference of the cold atom inertial sensor 50. The same reference signs denote the same elements than in FIG. 5. In this embodiment, the conventional inertial sensor 4 generates a raw signal 14. A part of the raw signal 14 is transmitted to the inertial navigation unit 100 and another part of the raw signal 14 is transmitted to the signal processing system 40 that generates a modulation signal 140. The modulation signal 140 is applied to the laser source 20 to modulate the central frequency of the laser source. Hence, a frequency difference of the laser source 10 is controlled in real time. That way, the cold atom inertial sensor 50 generates a first, hybrid, atomic interferometry inertial measurement signal 151 that is corrected in real time for the movements measured by the conventional inertial sensor 4. This correction allows ensuring the operation of the cold atom inertial sensor 50 despite the random movements of the reference.

Optionally, as illustrated in dotted line in FIG. 6, the cold atom inertial sensor 50 produces an error signal 150 that is used to directly apply a feedback to the inertial navigation system 100, without correction of the conventional inertial sensor 4. The error signal 150 consists of a part of the first hybrid signal 151. That way, the cold atom inertial sensor 50 and the conventional inertial sensor 4 mutually correct each other.

FIG. 7 illustrates another variant comprising a conventional inertial sensor 4, a calculator 30 and a cold atom inertial sensor 50. In this variant, the conventional inertial sensor 4 is attached to the reference of the cold atom inertial sensor 50. The conventional inertial sensor 4 may be similar to that described in connection with the embodiments illustrated in FIGS. 5 and 6.

In an exemplary embodiment, the conventional inertial sensor 4 belongs to an inertial navigation unit providing conventional inertial measurements in the reference of the cold atom inertial sensor 50. For example, the inertial navigation unit provides three-dimensional acceleration and rotation measurements.

In the embodiment of FIG. 7, the conventional inertial sensor 4 and the calculator 30 generate an inertial measurement signal 148, for example measurement of rotation and/or acceleration about one or several determined axes. As indicated hereinabove, the inertial measurement signal 148 is for example provided by conventional sensors of an inertial navigation unit, for example based on MEMS components. This inertial measurement signal 148 is transmitted to the signal processing system 40 that generates a modulation signal 140. The modulation signal 140 is applied to the laser source 20 to modulate the central frequency of the laser source. Hence, a frequency difference of the laser source 20 is controlled in real time. That way, the cold atom inertial sensor 50 generates a first hybrid, atomic interferometry inertial measurement signal 151 that is corrected in real time for the movements measured by the conventional inertial sensor 4 and the calculator 30. This correction makes it possible to ensure the operation of the cold atom inertial sensor 50 whatever the random variations of orientation and/or position of the reference.

Optionally, as illustrated in dash lines in FIG. 7, the cold atom inertial sensor 50 produces an error signal 150. The error signal 150 consists of a part of the first hybrid signal 151. The error signal 150 is used to directly apply a feedback to the calculator 30 to finely correct the measurements of the conventional inertial sensor 4, and possibly of the inertial navigation system 100 integrating this sensor 4, as a function of the measurement of the cold atom inertial sensor 50. Hence, the cold atom inertial sensor 50 and the conventional inertial sensor 4 mutually correct each other.

FIG. 8 shows an example of implementation according to another embodiment. In this example, the conventional inertial sensor 4 is an accelerometer, for example MEMS-based. The cold atom inertial sensor 50 is a cold atom accelerometer that measures the movements of the reference frame.

The conventional accelerometer 4 produces a continuous acceleration measurement 14, denoted $a_{cl}(t)$. This acceleration measurement 14 includes an acceleration component $a_0$ that corresponds to the acceleration of the system to be measured, another acceleration component, denoted $a_{vib}(t)$, which is associated with the vibrations of the apparatus and a spurious bias component $b(t)$, which varies slowly as a function time. Hence, the equation:

$$a_{cl}(t)=a_0+a_{vib}(t)+b(t)$$

The inertial navigation unit includes a computer 90. The apparatus further includes a clock 80, a microprocessor 41, a converter 42 and an optical frequency modulator 43.

A part 142 of the raw measurement 14 provided by the conventional accelerometer 4 is transmitted to a low frequency filter 9. The low frequency filter 9 extracts a measurement 19 from the continuous acceleration component $a_{DC}$. A calculator 70 subtracts this continuous acceleration component $a_{DC}$ from the acceleration measurement 155 produced by the cold atom accelerometer 50. The calculator 70 hence produces an error signal 170. Another calculator 30 calculates the sum of the other part 141 of the raw measurement 14 and of the error signal 170. The calculator 30 hence produces an acceleration signal 130 that is corrected from the bias drift of the conventional accelerometer 4. It is to be noted that the error signal 170 is updated at each measurement cycle of the cold atom accelerometer 50.

The acceleration signal 130 corrected for the bias drift is transmitted to the computer 90. The computer 90 corrects the acceleration measurement for the effects induced by movements, for example rotation, and generates an acceleration measurement $a_i(t)$, also denoted 190. A part 191 of the acceleration measurement $a_i(t)$ may be transmitted, for example, to an inertial navigation unit 100.

Advantageously, the computer of the inertial navigation unit 100 may transmit a data flow 193 to the computer 90. This data flow 193 comprises for example rotation measurements performed by the gyrometer(s) of the inertial navigation unit 100.

Another part 192 of the acceleration measurement $a_i(t)$ is transmitted to the microprocessor 41. The microprocessor 41 fulfills two functions. On the one hand, the microprocessor 41 integrates the acceleration measurement $a_i(t)$ as a function of time to deduce therefrom a measurement of relative speed 411 between the reference frame and the atoms, which are for example in free fall state. The clock 80 triggers a signal 180 of beginning of a measurement and integration cycle. On the other hand, the microprocessor 41 calculates a control phase 412 that ensures that the interferometer always operates in the vicinity of a half-fringe, where the sensitivity is maximum. The relative speed measurement 411 is transmitted to a microprocessor 42 comprising for example a combination of digital-analog converter ADC and/or DDS. The microprocessor 42 converts the relative speed measurement 411 into a radiofrequency signal 420 that corresponds to the Doppler frequency $f_D$ of the reference frame via the relation:

$$f_D(t)=k_{eff}v_i(t)/2\pi.$$

An operator 43 calculates the sum of the Doppler radiofrequency signal 420 and of the central frequency 2 of the laser source 20. For example, a value $f_c \approx 6.8$ GHz is chosen for the Raman transition of the atom of rubidium 87. Another radiofrequency signal 430 is hence obtained, which is transmitted to the laser source 20 so as to adjust the central frequency of this laser source 20.

The control phase 412 is also transmitted to the laser source 20 so as to trigger a phase hopping just before the last pulse at 2T.

The laser source 20 generates a sequence of pulses 120, for example $\pi/2-\pi-\pi/2$, towards the cold atom accelerometer 50. Hence, during each pulse, the frequency difference between the contra-propagating laser beams varies in real time according to the continuous acceleration component of the atoms induced by gravity and according to the frequency-modulated accelerations due to the vibrations and the movements of the apparatus. This real-time feedback loop ensures that the total phase shift induced by the accelerations remains in the vicinity of zero and that the contrast of the fringes in not reduced by the Doppler shift of the frequency $f_c$ of the laser source. During the last pair of pulses $\pi/2$, a control phase hopping of $\pm\pi/2$ is applied to control the position of the central fringe, and to ensure the sensitivity of the acceleration measurement.

During the same measurement cycle, the comparator 70 compares the acceleration measurement 155 provided by the cold atom accelerometer 50 and the measurement 19 of the continuous acceleration component $a_{DC}$ provided by the conventional accelerometer 4. The comparator 70 deduces therefrom an error signal 170 for the following measurement cycle. Hence, the feedback control method based on a feedback loop is terminated.

During a cycle [0; 2T], a measurement of a continuous component of the acceleration measurement 14 is acquired. The mean of the acceleration measurement 14 is calculated over the time interval [0; 2T]. The output of the cold atom accelerometer 50 provides an accurate measurement of $a_0$ at each cycle.

FIG. 9 illustrates an example of acceleration measurement according to an exemplary embodiment based on a system as described in connection with FIG. 5 or FIG. 8.

Figure 9A:
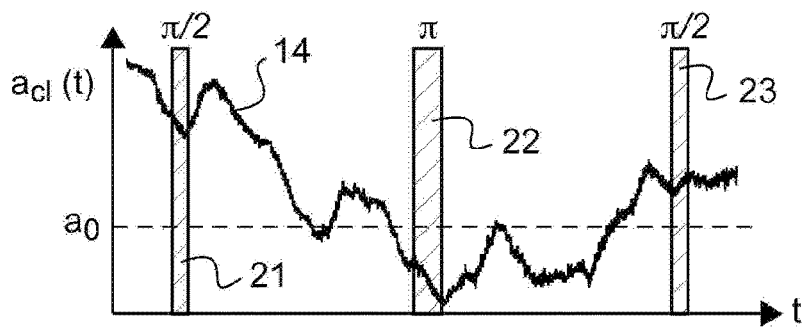
Figure 9B:
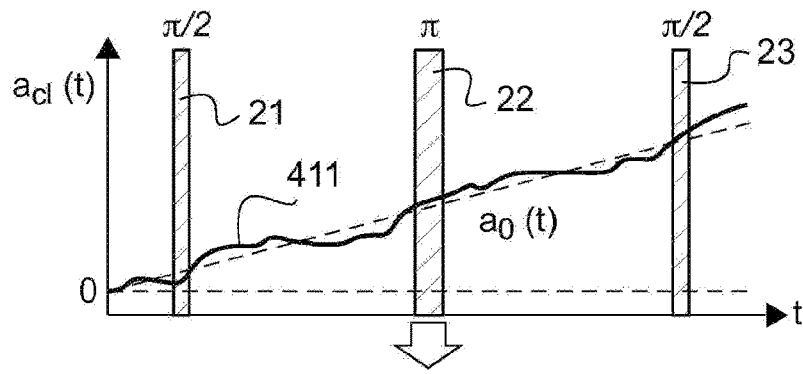
Figure 9C:
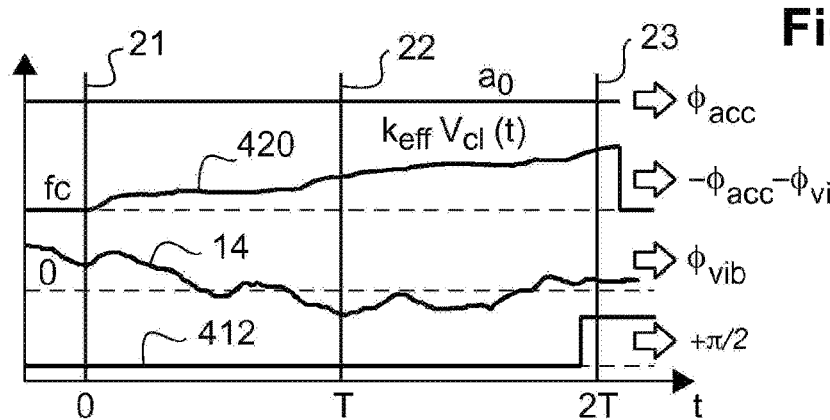

In FIG. 9A is shown a signal $a_{cf}(t)$ recorded as a function of time by means of a conventional accelerometer 4 fixed to the retro-reflecting mirror 8 during a sequence of pulses 21, 22, 23 or equivalently $\pi/2-\pi-\pi/2$. The raw signal shown in FIG. 9A is similar to the signal of FIG. 4A. In FIGS. 9A, 9B and 9C is shown a constant acceleration $a_0$ applying to the cold atoms. The signal $a_{cf}(t)$ records continuously and in real time the vibrations of the reference mirror 8 during the laser pulses of the cold atom interferometer.

In FIG. 9B is also shown, as a function of time, an integral of the acceleration signal provided by the conventional accelerometer. The signal 411 of FIG. 9B corresponds to the relative speed $v_{cf}(t)$ between the atoms and the reference mirror 8. The signal of FIG. 9B includes the relative movements of the reference frame induced by vibrations.

In FIG. 9C, the signal 411 of the relative speed $v_{cf}(t)$ is converted into a non-linear frequency ramp 420. The non-linear frequency ramp 420 is added to the frequency $f_c$ to form a frequency signal 430 modulated in real time. The non-linear frequency ramp allows cancelling automatically the phase shifts induced by accelerations and/or vibrations of the reference frame, in other words of the mirror 8, and compensates for the Doppler effect.

A phase hopping is applied just before the last pulse 23 of a sequence of pulses, so that the interferometer operates in the vicinity of the half-fringe, in the domain of linearity of the signal.

Figure 9D:
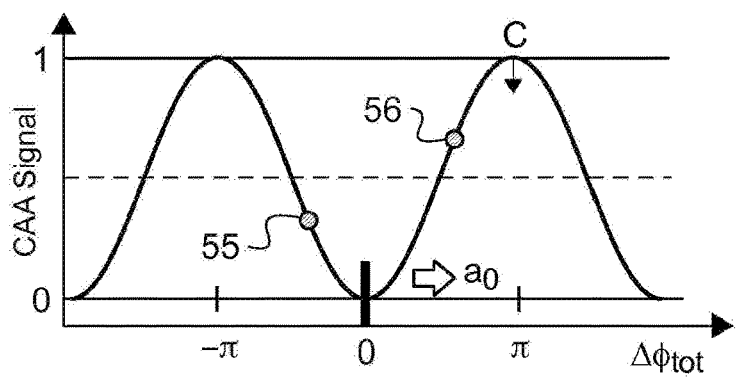

In FIG. 9D, two measurements 55, 56 of the signal provided by the atomic interferometer in the vicinity of the total phase shift of $\pm\pi/2$ can be seen. These measurements 55, 56 allow an accurate evaluation of the acceleration $a_0$.

Indeed, no contrast loss is constated due to the suppression in real time of the vibration effect.

An embodiment based on the hybridization of a conventional acceleration sensor and an accelerometer based on a cold atom interferometer (CAA) has been described.

However, the principle of the hybrid feedback loop system also applies to other types of inertial sensors.

In another example, the conventional inertial sensor used is a gyrometer adapted to measure a rotation of the system about an axis of rotation and variations in rotation. In this case, the cold atom interferometer is advantageously configured to measure a rotation, preferably about the same axis of rotation.

Particularly advantageously, the conventional inertial sensor is a sensor adapted to measure the accelerations and the rotations according to 6 degrees of freedom, and, similarly, the cold atom interferometric system is configured to measure the accelerations and the rotations according to the 6 degrees of freedom. A complete inertial system, corrected for each of the 6 degrees of freedom, is hence available.

Such a hybrid system provides measurements of position and orientation over a very extended measurement range, these measurements being corrected in real time for the movements of the inertial system reference.

The invention claimed is:

1. A hybrid inertial measurement system comprising:
   a cold atom interferometric inertial sensor (50) comprising a laser source (20) adapted to generate a sequence of laser pulses (21, 22, 23, 29) towards a cold atom burst (10) and a system for detecting an atomic interferometry inertial measurement signal relating to an inertial reference frame, and
   a conventional inertial sensor (4, 100) attached to the inertial reference frame of the cold atom interferometric inertial sensor (50), the conventional inertial sensor (4, 100) being adapted to provide a conventional inertial measurement signal (14, 148) of the inertial reference frame,
   wherein:
   the conventional inertial sensor (4, 100) is adapted to provide the conventional inertial measurement signal (14, 148) recorded as a function of time during said laser pulse sequence,
   and wherein the hybrid system includes a feedback loop electronic system comprising:
   a signal processing system (40, 41, 42) adapted to receive the inertial measurement signal (14, 141, 148) from the conventional inertial sensor (4, 100), the signal processing system (40, 41, 42) being adapted to generate in real time a non-linear frequency modulation signal (140, 420) as a function of the conventional inertial measurement signal (14, 141, 148) recorded as a function of time during said laser pulse sequence, each laser pulse of the laser pulse sequence (21, 22, 23, 29) having a predetermined optical frequency detuning with respect to a central optical frequency (2) of the laser source (20), the feedback loop electronic system being configured to modulate in real time the central optical frequency of the laser (20) as a function of the modulation signal (140, 420), so as to modulate in real time said laser pulse sequence (21, 22, 23, 29) and so that the cold atom interferometric inertial sensor (50) generates a first hybrid atomic interferometry inertial measurement signal (151) corrected for the relative movements of the inertial reference frame with respect to the cold atom burst (10) during a measurement cycle.

2. The hybrid system according to claim 1, wherein the inertial reference frame includes a reflective optical component (8) arranged so as to retro-reflect the laser pulse sequence (21, 22, 23, 29) and to generate a sequence of contra-propagative laser pulses towards the cold atom burst (10), the conventional inertial sensor (4, 100) being attached to the reflective optical component (8) of the cold atom interferometric inertial sensor (50).

3. The hybrid system according to claim 1, wherein the signal processing system (40, 41, 42) is adapted to further generate a signal (412) for correcting the phase-shift of the laser source (20).

4. The hybrid system according to claim 1, further comprising a phase hopping generator configured to generate a sampling adapted to extract an interference fringe phase measurement.

5. The hybrid system according to claim 1, wherein the signal processing system (40, 41, 42) is adapted to generate a frequency modulation signal comprising a linear modulation component and a non-linear modulation component as a function of time.

6. The hybrid system according to claim 1, wherein the conventional inertial sensor (4) includes a seismometer, a MEMS-based accelerometer, a MEMS-based gyrometer, a laser gyrometer or a fibre-optic gyrometer.

7. The hybrid system according to claim 1, comprising a calculator (30) adapted to receive a part (150) of the first hybrid signal (151), the calculator (30) being adapted to generate a second hybrid inertial measurement system (130, 132, 148, 149) as a function of the conventional inertial measurement signal (14) and of the part (150) of the first hybrid signal provided by the cold atom interferometric inertial sensor (50).

8. The hybrid system according to claim 7, wherein the cold atom interferometric inertial sensor (50) is adapted to generate an error signal (150, 170) by difference between the corrected atomic interferometry inertial measurement signal (150, 155) at a recurrence N of the measurement cycle and the atomic interferometry inertial measurement signal (150, 155) at a recurrence N-1, where N is a natural integer higher than or equal to two, and wherein the calculator (30) is adapted to receive the error signal (150, 170) and a first part of the inertial measurement signal (14, 141) of the conventional inertial sensor (4), the calculator (30) being adapted to deduce therefrom the second hybrid inertial measurement signal (130, 132, 148, 149).

9. The hybrid inertial measurement system according to claim 8, wherein the signal processing system (40, 41, 42) is adapted to receive the second hybrid inertial measurement signal and wherein the signal processing system (40, 41, 42) is adapted to sample a part of the second hybrid inertial measurement signal (130, 132, 148, 192) in replacement of the inertial measurement signal (14, 141, 148) of the conventional inertial sensor (4,100) and to generate in real time a non-linear frequency modulation signal (140, 420) as a function of said part of the second hybrid inertial measurement signal (130, 132, 148, 192).

10. The hybrid system according to claim 8, further comprising a coupler configured to sample in real time another part of the inertial measurement signal (142) provided by the conventional inertial sensor (4), a low-pass filter (9) adapted to filter a continuous component of said other part of the inertial measurement signal (142), a comparator (70) adapted to compare a continuous component (19) of said other part of the conventional inertial measurement signal with the atomic interferometric inertial measurement signal (155) to deduce therefrom a conventional inertial sensor bias error signal (170), and the calculator (30) being adapted to receive the bias error signal (170) and the first part of the conventional inertial sensor inertial measurement signal (14, 141), the calculator (30) being adapted to calculate in real time the second hybrid inertial measurement signal (130) by difference between the first part of the inertial measurement signal (14, 141) of the conventional inertial sensor (4) and the bias error signal (170).

11. The hybrid inertial measurement system according to claim 8, wherein the calculator (30) is adapted to transmit another part of the second hybrid inertial measurement signal (131, 191) towards an output of the hybrid inertial measurement system.

12. The hybrid inertial measurement system according to claim 7, wherein the conventional inertial sensor (4, 100) and the calculator (30) are part of an inertial navigation unit (100) comprising three accelerometers, three gyrometers and one computer adapted to generate an inertial navigation signal based on the measurements of the three accelerometers and the three gyrometers, the inertial navigation unit being adapted to receive said part (150) of the first hybrid signal (151), the inertial navigation unit (100) being adapted to generate a hybrid inertial navigation signal (152) as a function of the inertial navigation signal and of the part (150) of the first hybrid signal provided by the cold atom interferometric inertial sensor (50).

13. The hybrid inertial measurement system according to claim 12, wherein the inertial navigation unit is adapted to receive a part (150) of the first hybrid inertial measurement signal (151) and/or of the second hybrid inertial measurement signal (131, 191) and to generate a hybrid inertial navigation signal.

14. The hybrid system according to claim 7, wherein the cold atom interferometric inertial sensor (50) is configured to measure an atomic interferometric acceleration signal, the feedback loop comprising a microprocessor (41) adapted to integrate the acceleration signal as a function of time to deduce therefrom a measurement of relative instantaneous speed of the inertial reference frame with respect to the atom burst (10), and wherein the modulation signal (420) of the laser central frequency includes a slope proportional to the instantaneous speed measurement.

15. A hybrid inertial measurement method comprising the following steps:
  a. generating a sequence of laser pulses (21, 22, 23, 29) towards a cold atom burst (10), each laser pulse of the laser pulse sequence (21, 22, 23, 29) having a predetermined optical frequency detuning with respect to a central optical frequency (2) of the laser source (20), and detecting an atomic interferometry inertial measurement signal relating to an inertial reference frame;

b. detecting a conventional inertial measurement signal (14, 148) of the inertial reference frame recorded as a function of time during the laser pulse sequence;

c. processing the conventional inertial measurement signal (14, 148) to generate in real time a non-linear frequency modulation signal (140, 420) as a function of the conventional inertial measurement signal (14, 141, 148) recorded as a function of time during the laser pulse sequence;

d. modulating in real time the central optical frequency of the laser (20) as a function of the modulation signal (140, 420), so as to modulate in real time said laser pulse sequence (21, 22, 23, 29) and to generate a first hybrid atomic interferometry inertial measurement signal (151) corrected in real time for the relative movements of the inertial reference frame with respect to the cold atom burst (10) during a measurement cycle.

16. The hybrid system according to claim 2, wherein the conventional inertial sensor (4) includes a seismometer, a MEMS-based accelerometer, a MEMS-based gyrometer, a laser gyrometer or a fibre-optic gyrometer.

17. The hybrid system according to claim 9, further comprising a coupler configured to sample in real time another part of the inertial measurement signal (142) provided by the conventional inertial sensor (4), a low-pass filter (9) adapted to filter a continuous component of said other part of the inertial measurement signal (142), a comparator (70) adapted to compare a continuous component (19) of said other part of the conventional inertial measurement signal with the atomic interferometric inertial measurement signal (155) to deduce therefrom a conventional inertial sensor bias error signal (170), and the calculator (30) being adapted to receive the bias error signal (170) and the first part of the conventional inertial sensor inertial measurement signal (14, 141), the calculator (30) being adapted to calculate in real time the second hybrid inertial measurement signal (130) by difference between the first part of the inertial measurement signal (14, 141) of the conventional inertial sensor (4) and the bias error signal (170).

18. The hybrid system according to claim 2, further comprising a phase hopping generator configured to generate a sampling adapted to extract an interference fringe phase measurement.

19. The hybrid system according to claim 2, wherein the signal processing system (40, 41, 42) is adapted to generate a frequency modulation signal comprising a linear modulation component and a non-linear modulation component as a function of time.

20. The hybrid system according to claim 3, wherein the signal processing system (40, 41, 42) is adapted to generate a frequency modulation signal comprising a linear modulation component and a non-linear modulation component as a function of time.

* * * * *